United States Patent
Martelli

(10) Patent No.: US 6,406,069 B1
(45) Date of Patent: Jun. 18, 2002

(54) COLORANT FEEDER APPARATUS FOR POLYMER PROCESSING MACHINE

(75) Inventor: Daniel M. Martelli, Bridgeport, CT (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 09/594,378

(22) Filed: Jun. 15, 2000

(51) Int. Cl.$^7$ ............................. F16L 39/00; B05B 15/00
(52) U.S. Cl. ......................... 285/283; 222/164; 222/166
(58) Field of Search ................................. 285/283, 118, 285/184; 222/160, 164, 166

(56) References Cited

U.S. PATENT DOCUMENTS

| | | | |
|---|---|---|---|
| 3,258,848 A | * 7/1966 | Watlington | .................. 285/283 |
| 3,345,092 A | * 10/1967 | Athman et al. | ............. 285/283 |
| 3,815,941 A | * 6/1974 | Snyder | ......................... 285/283 |
| 4,048,267 A | * 9/1977 | Walker et al. | ............... 285/283 |
| 4,167,382 A | 9/1979 | Freedman et al. | |
| 4,418,844 A | 12/1983 | Hehl | |
| 4,423,774 A | * 1/1984 | Mefford | ....................... 285/283 |
| 4,715,404 A | * 12/1987 | Fusy | ........................... 285/283 |
| 4,756,855 A | 7/1988 | Mathis et al. | |
| 4,773,168 A | 9/1988 | Lamos et al. | |
| 4,850,304 A | 7/1989 | Nicholson | |
| 4,874,569 A | 10/1989 | Kuszyk et al. | |
| 5,232,751 A | 8/1993 | Cameron et al. | |
| 5,637,326 A | 6/1997 | Bogue et al. | |

FOREIGN PATENT DOCUMENTS

| | | | |
|---|---|---|---|
| EP | 406776 | * 1/1991 | .................. 285/283 |
| JP | 5057750 | 3/1993 | |

OTHER PUBLICATIONS

Photograph of a prior art coupler described by applicant in the Background of the Invention section of the application.

\* cited by examiner

*Primary Examiner*—Eric K. Nicholson
(74) *Attorney, Agent, or Firm*—Jones, Day, Reavis & Pogue

(57) ABSTRACT

A coupling apparatus couples a container of colorant to a feeder structure for a polymer processing machine. The coupling apparatus includes a tubular structure with an outlet portion that engages the feeder structure, and an inlet portion that receives and supports the container above the outlet portion. The inlet portion has an upright position in which it supports the container in an overturned position from which the colorant can flow out of the container under the force of gravity. A joint, which is preferably a hinge, supports the inlet portion for movement to an overturned position. The inlet portion can then receive the container in an upright position from which the colorant will not spill from the container. Preferably, a releaseable locking device interacts with the joint to retain the inlet portion of the tubular structure releaseably in its upright position. Moreover, the inlet portion of the tubular structure is preferably moveable relative to the output portion rotationally about a vertical axis when the inlet portion is in its upright position. This enables the container to swivel to a convenient position about the vertical axis. A clamp retains the container releaseably in a selected position about the vertical axis by blocking such rotational movement of the inlet portion.

5 Claims, 3 Drawing Sheets

COLORANT FEEDER APPARATUS FOR POLYMER PROCESSING MACHINE

FIELD OF THE INVENTION

The present invention relates to a polymer processing machine, and particulary relates to an apparatus for feeding colorant to the machine.

BACKGROUND OF THE INVENTION

Some types of polymer processing machines, such as molding or extrusion machines, use colorant in the form of small pellets which are fed to the machine through a hopper. The colorant is poured into the hopper from a container. The pellets can be accidently spilled from the container or the hopper onto the floor or adjacent machinery.

For example, as shown schematically in FIG. 1, a known colorant feeding system 10 includes a hopper 12 with an open upper end 14 for receiving colorant. An outlet in the form of a tubular neck 16 at the bottom of the hopper 12 delivers the colorant to a feeder block 18. An auger 20 with a stepper motor 22 drives the colorant along an axis 23 from left to right, as viewed in FIG. 1, from the feeder block 18 through an adapter 24 which couples the feeder block 18 to the polymer processing machine (not shown). An operator controls this colorant feeding process by the use of a controller 26 with an instrument panel 28. As noted above, the colorant can be spilled onto the floor or adjacent machinery when it is being poured into the open upper end 14 of the hopper 12.

In an alternative arrangement, as shown schematically in FIG. 2, the hopper 12 is omitted and a coupler 30 is used to couple a container 32 of colorant to the feeder block 18. The coupler 30 comprises a tubular structure through which the colorant can flow from the container 32 to the feeder block 18 under the force of gravity. A neck 34 at the lower end of the coupler 30 is configured as an outlet which is substantially the same as the outlet 16 at the bottom of the hopper 12. A rotatable cap 36 at the upper end of the coupler 30 receives the neck 38 of the container 32. The coupler 30 is thus configured to receive and support the container 32 above the feeder block 18 in an overturned position such that the colorant can flow from the container 32 into the feeder block 18 through the coupler 30.

A slide gate 40 on the coupler 30 operates in a known manner to open and close the flow path through the coupler 30, and thereby to control the flow of colorant from the container 32 into the feeder block 18. However, the colorant can be spilled from the container 32 when it is being mounted on, or removed from, the cap 36 at the upper end of the coupler 30.

SUMMARY OF THE INVENTION

The present invention provides an apparatus for coupling a container of colorant to a feeder structure for a polymer processing machine. The coupling apparatus includes a tubular structure defining a passage through which the colorant can flow from the container to the feeder structure. An outlet portion of the tubular structure is configured to engage the feeder structure. An inlet portion of the tubular structure is configured to receive and support the container above the outlet portion.

In accordance with the invention, the coupling apparatus further includes a joint which supports the inlet portion of the tubular structure for movement relative to the outlet portion between an upright position and an overturned position when the outlet portion is engaged with the feeder structure. When the inlet portion is in its upright position, it is oriented to support the container in an overturned position from which the colorant can flow out of the container under the force of gravity. When the inlet portion is in its overturned position, it is oriented to receive the container in an upright position from which the colorant will not spill from the container.

In a preferred embodiment of the invention, the coupling apparatus includes a releaseable locking device which interacts with the joint to retain the inlet portion of the tubular structure releaseably in its upright position. The joint in the preferred embodiment is a hinge supporting the inlet portion of the tubular structure for movement relative to the outlet portion pivotally about a horizontal axis.

Further in accordance with the invention, the inlet portion of the tubular structure in the preferred embodiment is moveable relative to the output portion rotationally about a vertical axis when the inlet portion is in its upright position. This enables the container to swivel to a convenient position relative to the other parts of the colorant feeding system. A clamp retains the container releaseably in a selected position about the vertical axis by blocking such rotational movement of the inlet portion of the tubular structure.

DESCRIPTION OF A PREFERRED EMBODIMENT

Figure 1:
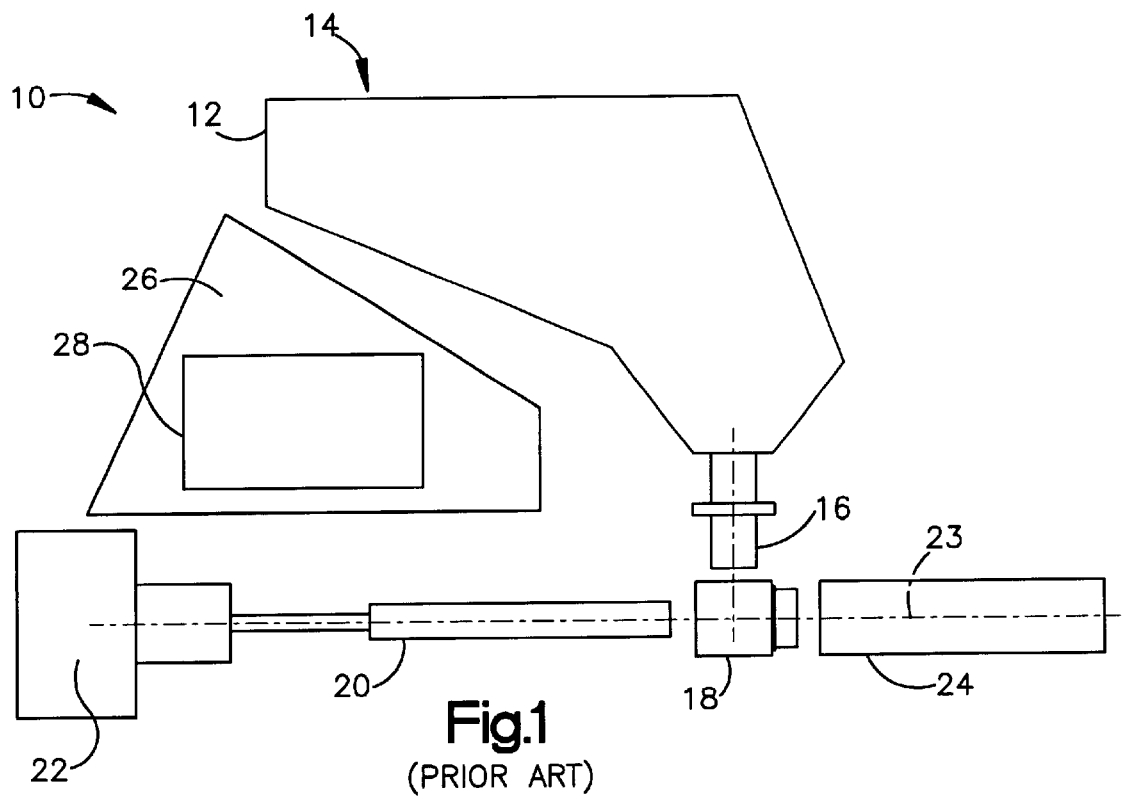
FIG. 1 is an exploded schematic view of parts of a colorant feeding system known in the prior art.
Figure 2:
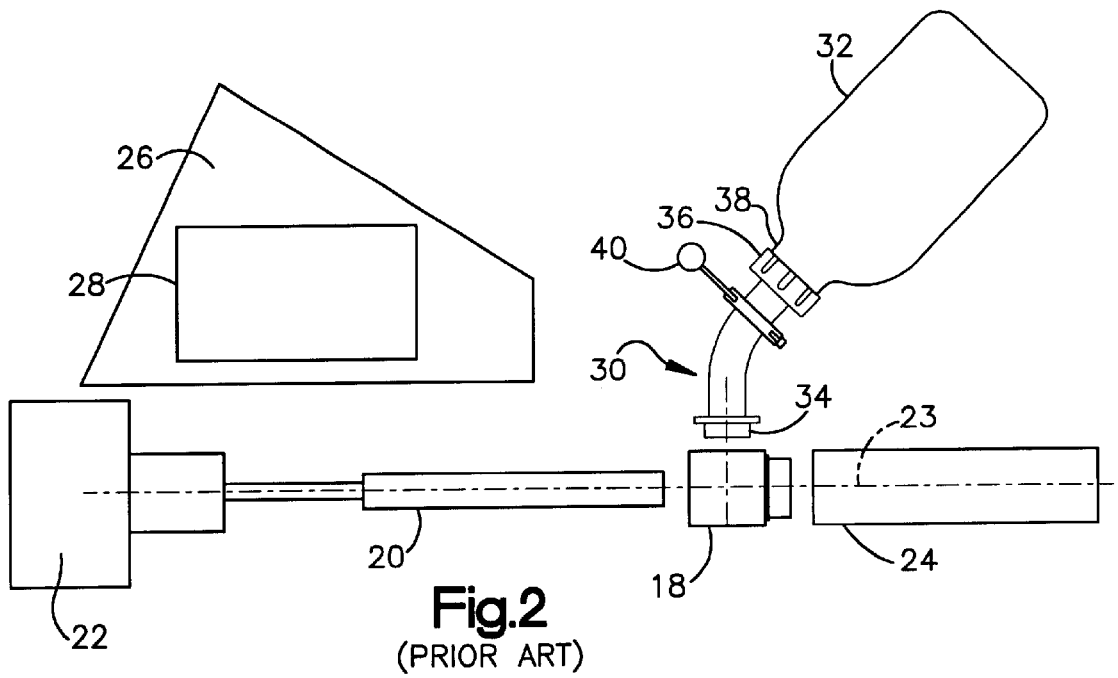
FIG. 2 also is a schematic exploded view of parts of a colorant feeding system known in the prior art.
Figure 3:
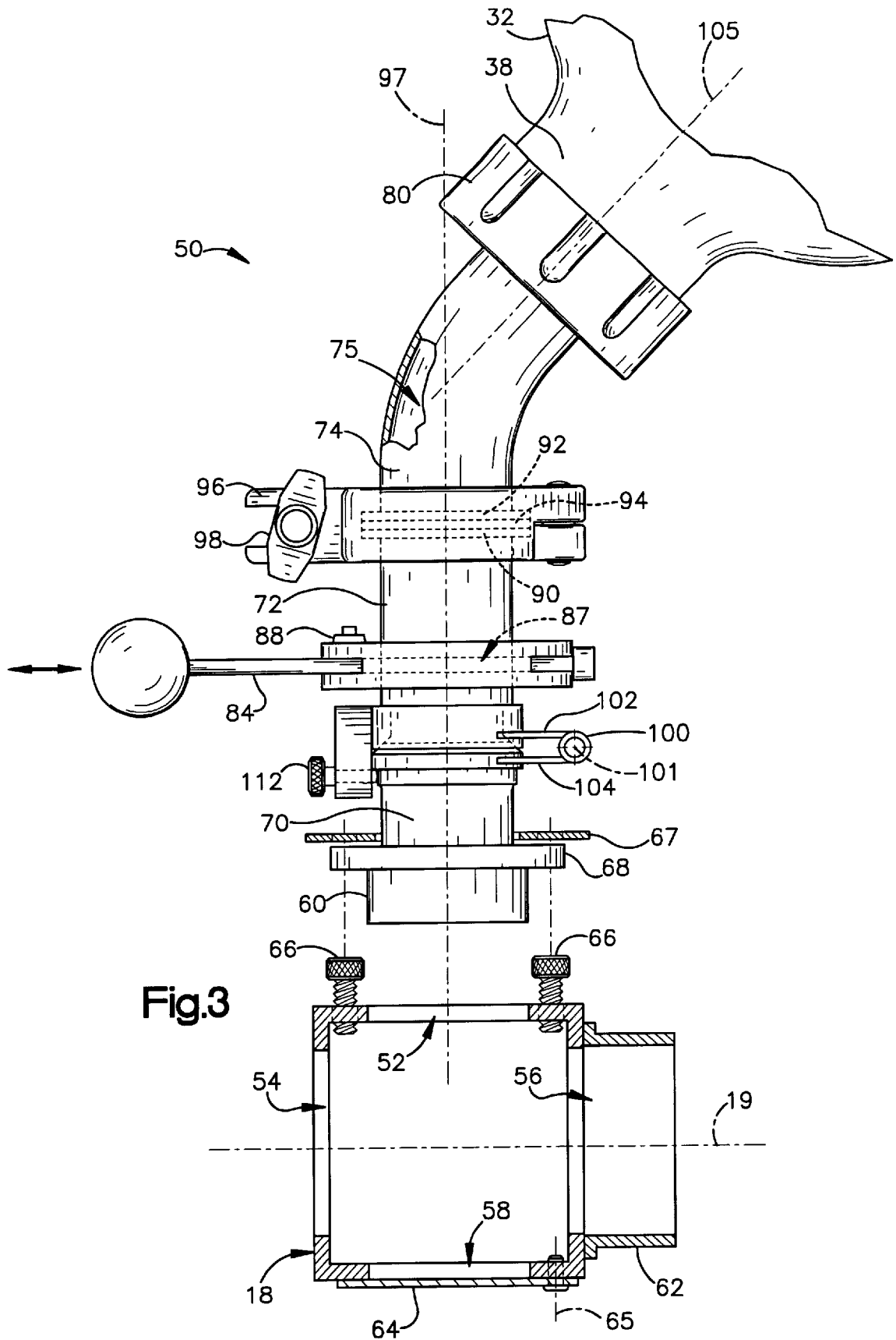
FIG. 3 is a detailed view of parts of an apparatus comprising a preferred embodiment of the present invention.
Figure 4:
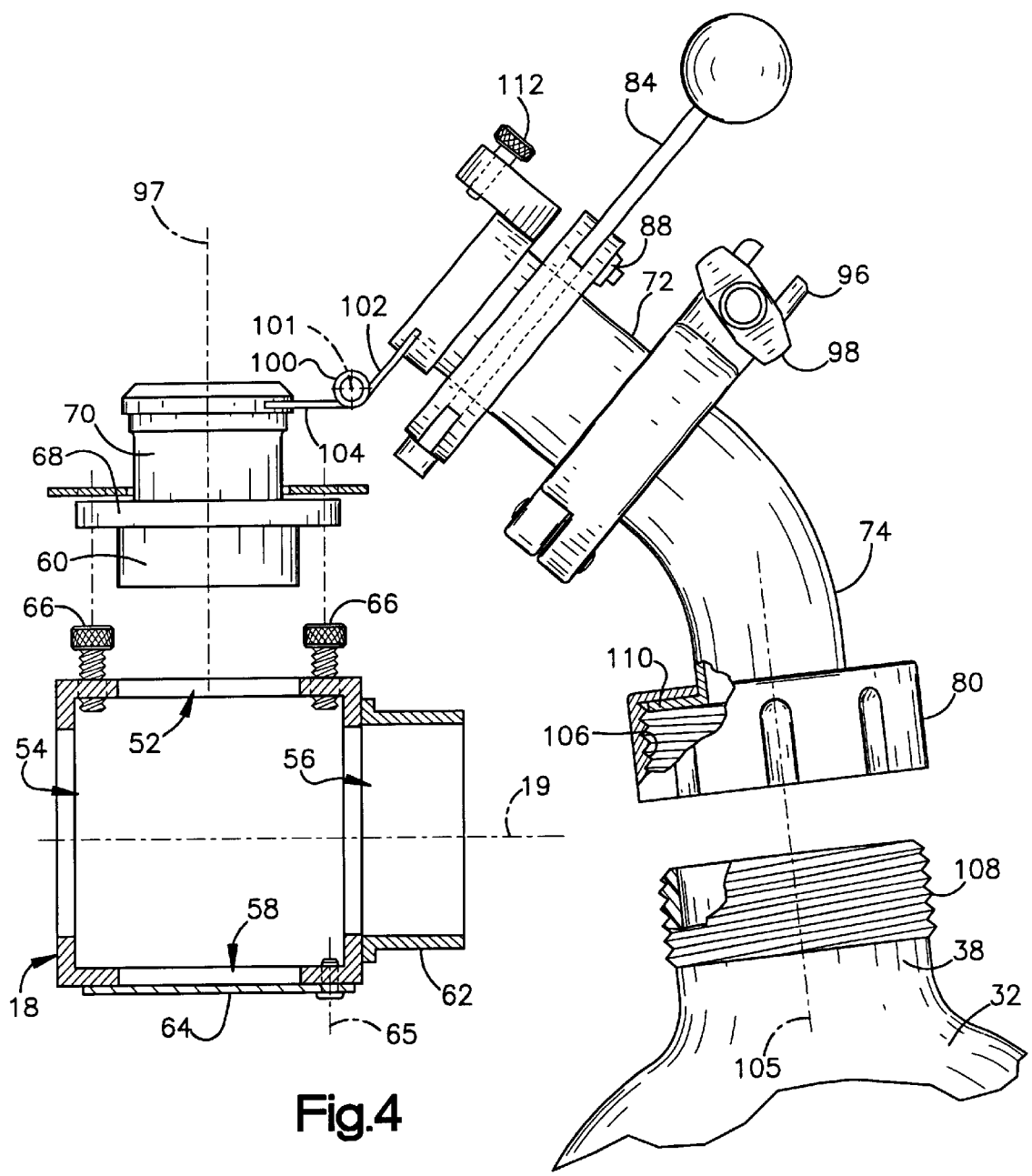
FIG. 4 is a view similar to FIG. 3 showing parts in different positions.

A coupler 50 comprising a preferred embodiment of the present invention is shown in FIGS. 3 and 4. Like the coupler 30 (FIG. 2) described above, the coupler 50 is a tubular structure through which colorant can flow from the container 32 into the feeder block 18 under the force of gravity. However, when the coupler 50 is engaged with the feeder block 18, it enables the container 32 to be installed and removed in an upright position, as shown in FIG. 4. This helps to ensure that the colorant is not spilled from the container 32.

As shown in greater detail in FIG. 3, the feeder block 18 in the illustrated embodiment is shaped as a cube with openings 52, 54, 56 and 58 at four of its sides. A tubular neck 60 at the lower end of the coupler 50 is receivable closely within the opening 52 at the top of the feeder block 18. The neck 60 is thus configured as an outlet from which colorant can flow freely downward from the coupler 50 into the feeder block 18. An opening 54 at one side of the feeder block 18 receives the auger 20 (FIG. 2), and an opposed opening 56 leads to a fitting 62 which, in turn, receives the adapter 24 for the polymer processing machine. A lower opening 58 for cleaning out the feeder block 18 is normally closed by an access panel 64 that swivels about a vertical axis 65. A pair of fasteners 66 at the top of the feeder block 18 are engageable with a clamp 67 above a flange 68 on the neck 60, and can be tightened by hand to retain the coupler 50 securely in an installed position on the feeder block 18.

The neck 60 at the lower end of the coupler 50 is defined by a lower tubular section 70 of the coupler 50. The coupler 50 further has first and second upper tubular sections 72 and 74 which, together with the lower tubular section 70, define an internal passage 75 extending throughout the length of the coupler 50. An inlet to the passage 75 is defined by the second upper tubular section 74 and a rotatable cap 80 at the upper end of the coupler 50. The cap 80 supports the container 32 in the overturned position of FIG. 3 so that the colorant can flow downward from the container 32 through the passage 75 and into the feeder block 18.

A slide gate 84 is moveable back and forth across the internal passage 75 between open and closed positions. When the slide gate 84 is in its open position, as shown in FIG. 3, an opening 87 in the slide gate 84 is aligned with the passage 75 to permit the colorant to flow freely downward through the passage 75. Alternatively, when the slide gate 84 is in its closed position, the opening 87 is spaced transversely from the passage 75 such that the slide gate 84 blocks the colorant from flowing downward past the location of the slide gate 84. In a preferred embodiment of the invention, the coupler 50 has a ball detent 88 which releasably retains the slide gate 84 in its open and closed positions.

As further shown in FIG. 3, the upper sections 72 and 74 of the coupler 50 have axially abutting flanges 90 and 92, respectively. A gasket 94 is received between the flanges 90 and 92. A clamp 96 engages the flanges 90 and 92 to retain the gasket 94 and the upper sections 72 and 74 together in positions centered on a vertical axis 97. The second upper section 74 can be rotated about the axis 97 relative to the first upper section 72 when a wing nut 98 on the clamp 96 is loosened, and can be releaseably secured in a selected position about the axis 97 upon retightening of the wing nut 98. This feature of the invention enables the operator to rotate the container 32 about the axis 97 relative to the feeder block 18 and the other parts of the apparatus for convenient positioning of the container 32.

The coupler 50 further includes a joint 100 which, in the preferred embodiment, is a hinge 100 with a horizontal axis 101. An upper leaf 102 on the hinge 100 is fixed to the first upper section 72 of the coupler 50. A lower leaf 104 on the hinge 100 is fixed to the lower section 70 of the coupler 50. Accordingly, the parts of the coupler 50 that are located above the lower section 70 are movable relative to the lower section 70 pivotally about the axis 101. This enables those parts of the coupler 50 to be overturned from the positions in which they are shown in FIG. 3 to the positions in which they are shown in FIG. 4 while the coupler 50 remains installed on the feeder block 18.

As shown in FIG. 4, the cap 80 is oriented so that the neck 38 of the container 32 can be connected with, or disconnected from, the cap 80 in the upright position in which the container 32 is shown in FIG. 4. Specifically, the cap 80 is rotatable about an axis 105 relative to the container 32 and the other parts of the coupler 50. An internal screw thread 106 on the cap 80 engages an external screw thread 108 on the neck 38 of the container 32 so as to draw the neck 38 upward into the cap 80 until the neck 38 moves into abutment with a flange 110 at the end of the second upper tubular section 74. Importantly, this is accomplished with the container 32 in an upright position in which the colorant will not be spilled from the container 32. The parts shown in FIG. 4 are then returned to the positions in which they are shown in FIG. 3, and are releaseably held in place by a locking screw 112 until the container 32 is to be replaced.

The invention has been described with reference to a preferred embodiment. Those skilled in the art may perceive improvements, changes and modifications. For example, although the coupler 50 in the preferred embodiment has an inlet defined in part by the rotatable cap 80, any other structure suitable for receiving and supporting a container of colorant in accordance with the invention could be used as an alternative. Such improvements, changes and modifications are intended to be within the scope of the claims.

What is claimed is:

1. An apparatus for releasably coupling a container of colorant to a feeder structure for a polymer processing machine, the container having an orifice, said coupling apparatus comprising:
   a tubular structure for defining a closed passage through which the colorant can flow by gravity from the container to the feeder structure, said tubular structure comprising
   (a) an outlet portion configured to sealingly engage the feeder structure,
   (b) an inlet portion configured to sealingly engage said container through the orifice thereof, said inlet portion configured to receive and adjustably support the container in an overturned orientation above said outlet portion, and
   (c) a central portion disposed between said inlet and outlet portion and in sealing engagement with each, said inlet portion being engageable with said central portion so as to allow relative rotational movement between said inlet and central portions, said central portion further comprising a joint that allows movement of the inlet portion from a downwardly extending orientation in which the container can be mounted to the inlet portion while said container is in a substantially upright orientation, to an upwardly extending orientation in which the container is in an overturned orientation, to permit gravity flow of the colorant from the container through said inlet portion, into said central portion, and through said outlet portion into the feeder structure.

2. The coupling apparatus of claim 1 wherein said inlet portion is non-linear such that when the container is mounted thereon in an overturned orientation, the container is axially offset from said outlet portion, and further such that when said inlet portion is rotated relative to said central portion, the container is moved from one position to another relative to the feeder structure.

3. The coupling apparatus of claim 2 wherein said joint comprises a hinge.

4. The coupling apparatus of claim 3 further comprising a clamp that retains the container in a selected position relative to the feeder structure by blocking said rotational movement of said inlet portion of said tubular structure.

5. In an apparatus for coupling a container of colorant to a feeder structure for a polymer processing machine, the apparatus comprising a tubular structure defining a passage between the container and the feeder structure, the tubular structure comprising an inlet portion for engagement with the container and an outlet portion for engagement with the feeder structure, the improvement comprising a central portion disposed between said inlet portion and said outlet portion, said central portion comprising a joint that allows relative movement of said inlet portion between a downwardly extending orientation suitable for mounting the container on the inlet portion while the container is in a substantially upright orientation and an upwardly extending orientation in which said container is supported above said feeder apparatus in an overturned orientation to allow gravity flow of said colorant through said tubular structure into the feeder structure, and wherein said central portion is adapted to allow said inlet portion to rotate relative to said central portion while in the upwardly extending orientation so as to allow the container to be moved to a desired position relative to the feeder structure.

* * * * *